(12) United States Patent
Sato

(10) Patent No.: US 7,626,306 B2
(45) Date of Patent: Dec. 1, 2009

(54) LAMINATED CORE STRUCTURE OF MOTOR

(75) Inventor: Yasuo Sato, Kashiwa (JP)

(73) Assignee: Oriental Motor Co., Ltd., Tokyo (JP)

( * ) Notice: Subject to any disclaimer, the term of this patent is extended or adjusted under 35 U.S.C. 154(b) by 215 days.

(21) Appl. No.: 11/946,476

(22) Filed: Nov. 28, 2007

(65) Prior Publication Data

US 2008/0129141 A1    Jun. 5, 2008

(30) Foreign Application Priority Data

Dec. 1, 2006    (JP)    .............................. 2006-325254

(51) Int. Cl.
    *H02K 1/06*    (2006.01)
(52) U.S. Cl. ............................ 310/217; 310/43; 310/45
(58) Field of Classification Search ................... 310/43, 310/45, 254, 216–217, 261, 259
    See application file for complete search history.

(56) References Cited

U.S. PATENT DOCUMENTS

| | | | | |
|---|---|---|---|---|
| 3,646,374 A * | 2/1972 | Jordan et al. | ................... | 310/45 |
| 5,075,585 A * | 12/1991 | Teruyama et al. | ............. | 310/89 |
| 5,866,961 A * | 2/1999 | Suzuki et al. | ............. | 310/67 R |
| 6,043,583 A * | 3/2000 | Kurosawa et al. | ......... | 310/254.1 |
| 6,191,510 B1 * | 2/2001 | Landin et al. | .................. | 310/51 |
| 6,351,042 B1 * | 2/2002 | Takayanagi | .................... | 310/43 |
| 6,407,472 B1 * | 6/2002 | Takayanagi | .................... | 310/45 |
| 6,538,548 B2 * | 3/2003 | Akita et al. | .................. | 336/234 |
| 6,992,419 B2 * | 1/2006 | Kim et al. | .................... | 310/266 |
| 7,268,460 B2 * | 9/2007 | Mitsui | ................. | 310/216.004 |
| 7,294,942 B2 * | 11/2007 | Lee et al. | ....................... | 310/43 |
| 7,352,101 B2 * | 4/2008 | Fujita | .................. | 310/216.011 |

FOREIGN PATENT DOCUMENTS

JP    2001-292541 A    10/2001

* cited by examiner

*Primary Examiner*—Thanh Lam
(74) *Attorney, Agent, or Firm*—Alston & Bird LLP

(57) ABSTRACT

The laminated core structure of a motor includes a stator iron core formed by laminating a plurality of stator iron core thin sheets in which a plurality of magnetic poles are provided at fixed intervals along the circumferential direction on the inner peripheral side so as to project toward the center direction, and a rotor iron core arranged on the axis line of the stator iron core concentrically with the stator iron core and formed by laminating a plurality of disc-shaped rotor iron core thin sheets, the stator iron core and the rotor iron core each being fastened by caulking the plurality of thin sheets to each other. The core loss produced by caulking is decreased by particular placement of the center of a caulking uneven part of the stator iron core thin sheet and the center of a caulking uneven part of the rotor iron core thin sheet.

2 Claims, 5 Drawing Sheets

LAMINATED CORE STRUCTURE OF MOTOR

CROSS REFERENCE TO RELATED APPLICATIONS

This application claims the benefit of Japanese Patent Application No. 2006-325254, filed Dec. 1, 2006, which is incorporated herein by reference in its entirety and for all purposes.

BACKGROUND OF THE INVENTION AND RELATED ART STATEMENT

1. Field of the Invention

The present invention relates to a laminated core structure of a motor.

2. Description of Related Art

When a laminated core structure of a motor is formed, as a method for laminating and fastening thin iron sheets, which have been obtained by blanking a silicon steel sheet etc., a method called caulking has generally been used in which uneven parts are formed in a part of the iron sheet by a fabrication method called embossing, and the uneven parts are engaged with each other.

In the fastening caused by caulking, the uneven part exerts resistance to the passage of magnetic flux, so that the magnetic balance of the whole of a magnetic circuit is upset, and the motor characteristics are influenced adversely. Therefore, proposals for solving this problem have been made.

FIGS. 6 and 7 show a conventional laminated core structure of a stepping motor. FIG. 6 shows a stator iron sheet 100 used for a stator iron core of the stepping motor, and FIG. 7 shows a rotor iron sheet 105 used for a rotor iron core thereof (refer to Japanese Unexamined Patent Application Publication No. 2001-292541 that discloses a related art).

For this stator iron sheet 100, an electrical steel sheet is used as the material thereof. The stator iron sheet 100 is provided with a plurality of (eight in the example shown in the figure) magnetic poles 101 arranged at fixed intervals along the circumferential direction on the inner peripheral side of a substantially square-shaped sheet so as to project toward the center direction. In the root part of the magnetic pole 101, a bridge part 101a around which a stator winding is wound is provided, and between the magnetic poles 101, a slot 101b for allowing the stator winding to pass through is provided. At four corners of the stator iron sheet 100, assembling screw holes 102 are provided, and in portions on both sides of the assembling screw hole 102, caulking uneven parts 103 are provided. Also, the bridge part 101a of the magnetic pole 101 is also provided with a caulking uneven part 104.

The rotor iron sheet 105 is provided with a plurality of caulking uneven parts 106 arranged at fixed intervals along the circumferential direction in the peripheral edge portion of a disc-shaped sheet.

According to this related art, the stator iron sheets 100 are assembled integrally by lapping and laminating the stator iron sheets 100 on each other so that the caulking uneven parts 103 and the caulking uneven parts 104 each are aligned with each other, and pushing the caulking uneven parts 103 and the caulking uneven parts in each other, by which the stator iron core is manufactured. The rotor iron sheets 105 are also assembled integrally by lapping and laminating the caulking uneven parts 106 and by pushing the caulking uneven parts 106 in each other, by which the rotor iron core is manufactured.

The caulking uneven part 103 of this related art has a diameter of 1 mm or smaller, and the caulking uneven part 104 has a diameter of 0.8 mm or smaller. Also, the caulking uneven part 106 of the rotor iron sheet 105 has a diameter of 0.8 mm or smaller.

The height of a convex part of the caulking uneven part 103 is set so as to be about 70% of the sheet thickness.

In Japanese Unexamined Patent Application Publication No. 2001-292541, the center shift between a die and a punch for embossing is set at 3 μm or smaller. Thereby, when the stator iron sheets 100 and the rotor iron sheets 105 are laminated by engaging the caulking uneven parts 103, 104 and 106 with each other, the occurrence of galling in the uneven part engagement portions is eliminated, and thereby thin steel sheets can be brought into close contact with each other.

A low-loss laminated core obtained by figuring out the shape and size of the caulking part has been proposed.

As shown in FIG. 8, a magnetic path X of a hybrid stepping motor is usually formed as indicated by the arrow marks. Therefore, in the technique in Japanese Unexamined Patent Application Publication No. 2001-292541 as well, the caulking uneven parts are formed in intermediate portions in the magnetic path X, so that the caulking uneven parts still exist as magnetic resistance, which causes a core loss.

Also, the rotor of the hybrid stepping motor is generally constructed so that the rotor is formed by holding a permanent magnet using a magnet of rare earth etc. between two rotor iron cores. Therefore, in the hybrid stepping motor, the quantity of iron material for the rotor iron core is considerably smaller than that for the stator iron core.

For this reason, a loss of motor (core loss) produced by the decrease in magnetic characteristics caused by the caulking of rotor iron core has been thought to be considerably small. Therefore, the caulking position of rotor iron core has so far not been studied sufficiently.

OBJECT AND SUMMARY OF THE INVENTION

The present invention has been made to solve the above problems, and accordingly an object thereof is to provide a laminated core structure of a motor, in which a core loss produced by caulking is decreased as far as possible.

To achieve the above object, the present invention provides a laminated core structure of a motor, including a stator iron core formed by laminating a plurality of stator iron core thin sheets in which a plurality of magnetic poles are provided at fixed intervals along the circumferential direction on the inner peripheral side so as to project toward the center direction, and a rotor iron core which is arranged on the axis line of the stator iron core concentrically with the stator iron core and is formed by laminating a plurality of disc-shaped rotor iron core thin sheets, the stator iron core and the rotor iron core each being fastened by caulking the plurality of thin sheets to each other, wherein the center of a caulking uneven part of the stator iron core thin sheet is provided on the outside of a minimum circle the radius of which is a distance from the center of the stator iron core thin sheet to the shortest outer edge thereof, and the center of a caulking uneven part of the rotor iron core thin sheet is provided on the inside from an outer edge of the rotor more than the width from an outside edge of the stator iron core thin sheet to a slot part thereof.

Also, according to the present invention, the stator iron core has a substantially square-shaped external shape, and the center of the caulking uneven part of the stator iron core thin sheet is provided between an assembling screw hole formed at four corners of the stator iron core thin sheet and a corner outer edge of the stator iron core thin sheet.

According to the first aspect of the present invention, since the center of the caulking uneven part of the stator iron core thin sheet is provided on the outside of the minimum circle the radius of which is a distance from the center of the stator iron core thin sheet to the shortest outer edge thereof, and the center of the caulking uneven part of the rotor iron core thin sheet is provided on the inside from the outer edge of the rotor more than the width from the outside edge of the stator iron core thin sheet to the slot part thereof, both the caulking positions of the stator iron core and rotor iron core are located at a place that is not on the main magnetic path, so that a core loss caused by caulking can be restrained as far as possible.

According to the second aspect of the present invention, since the center of the caulking uneven part of the stator iron core thin sheet is provided between the assembling screw hole formed at four corners of the stator iron core thin sheet and the corner outer edge of the stator iron core thin sheet, the caulking position can be located at a position farthest from the magnetic path, so that a core loss caused by caulking can be restrained as far as possible.

DETAILED DESCRIPTION OF PREFERRED EMBODIMENTS

Figure 1:
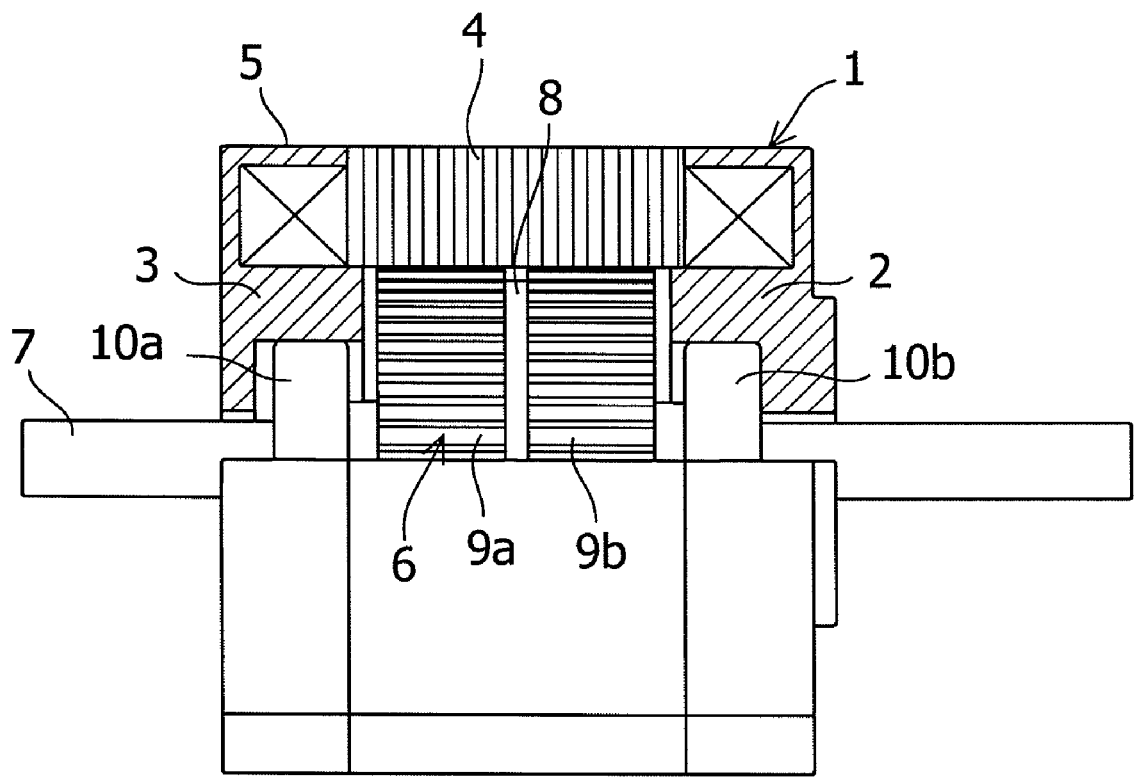
FIG. 1 is a partially sectioned view showing a construction of a hybrid stepping motor.

FIG. 1 is a construction view of a hybrid stepping motor 1. In this hybrid stepping motor 1, a stator iron core 4 is arranged between a motor flange 2 and a bracket 3 to form a motor case 5, and a rotor 6 is arranged within the motor case 5. The rotor 6 is formed by a magnet 8 supported on the center axis line of an output shaft 7 and rotor iron cores 9a and 9b. The both sides of the magnet 8 are held by the rotor iron cores 9a and 9b.

The rotor 6 is arranged concentrically on the axis line of the stator iron core (stator) 4 by being supported rotatably on the output shaft 7 via bearings 10a and 10b mounted on the bracket 3 and the motor flange 2, respectively.

Figure 2:
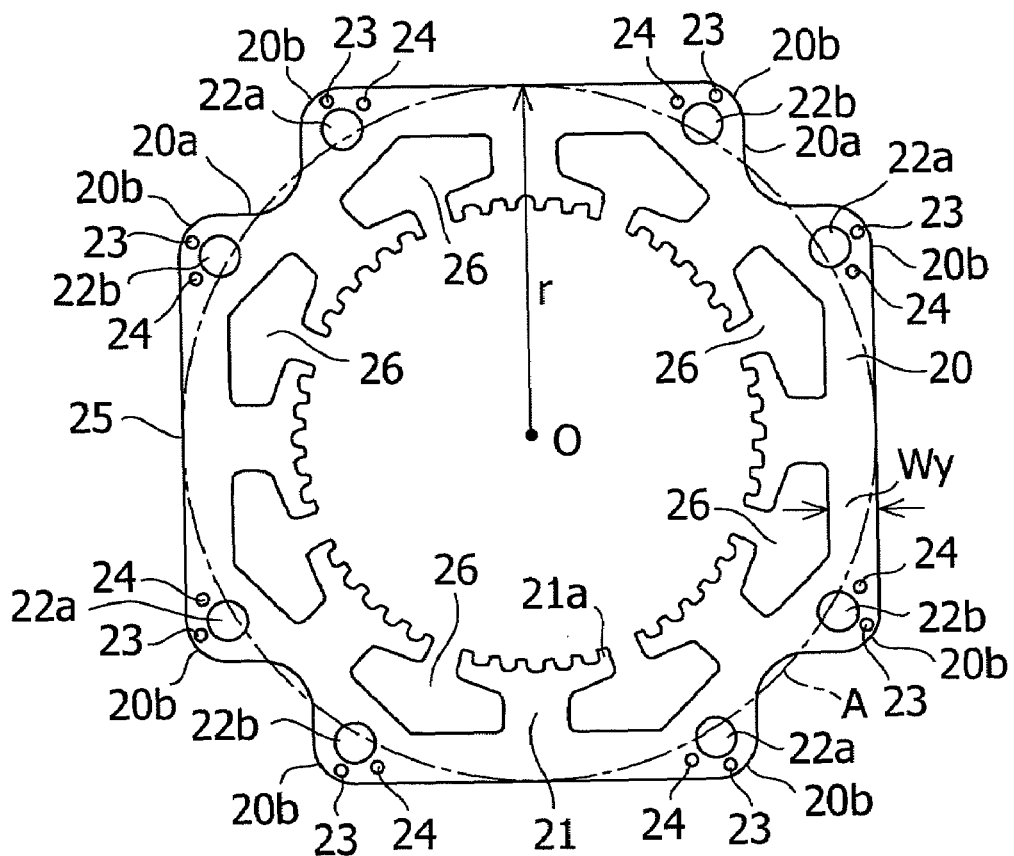
FIG. 2 is a plan view showing caulking uneven parts of a stator iron sheet in accordance with one embodiment of the present invention.
Figure 3:
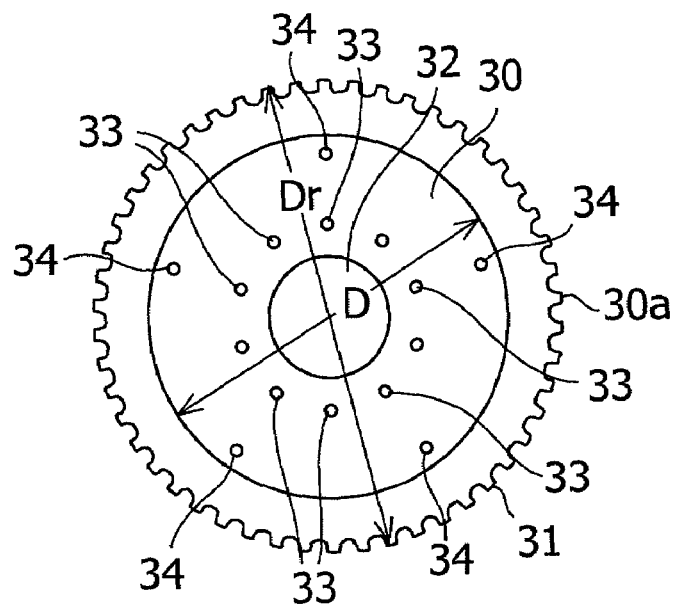
FIG. 3 is a plan view showing caulking uneven parts of a rotor iron sheet in accordance with one embodiment of the present invention.

FIG. 2 shows a stator iron sheet (thin sheet for stator iron core) 20 constituting the stator iron core 4, and FIG. 3 shows a rotor iron sheet 30 constituting the rotor iron core 9. The stator iron sheet 20 uses an electrical steel sheet as the material thereof, and is fabricated into a substantially square-shaped sheet by blanking. The stator iron sheet 20 is provided with a plurality of magnetic poles 21, which project toward the center direction, at fixed intervals along the circumferential direction on the inner periphery side, and many pole teeth (small teeth) 21a are provided at the tip end of each of the magnetic poles 21. At four corners of the sheet forming the stator iron sheet 20, notch parts 20a are formed, and at positions on both sides of the notch part 20a, assembling screw holes 22 are formed.

On the other hand, the rotor iron sheet (thin sheet for rotor iron core) 30 uses an electrical steel sheet as the material thereof like the stator iron sheet 20, and is fabricated into an annular thin sheet by blanking. The rotor iron sheet 30 is formed with many pole teeth (small teeth) 31 in the peripheral edge part thereof, and a hole 32 for inserting the output shaft 7 is formed in the center of the rotor iron sheet 30.

On the stator iron sheet 20, caulking uneven parts 23 and 24 are formed between the assembling screw hole 22 and a corner outer edge 20b of the stator iron sheet 20 by embossing. The centers of these caulking uneven parts 23 and 24 are provided on the outside of a minimum circle A the radius r of which is a distance from the center O of the stator iron sheet 20 to the shortest outer edge thereof. One caulking uneven part 23 of the caulking uneven parts 23 and 24 is provided at a position farthest from the center of the stator iron sheet 20 substantially on the extension line passing through the center of the assembling screw hole 22 from the center of the stator iron sheet 20 so as to be farthest from the magnetic path. Also, the caulking uneven part 24 is provided between the assembling screw hole 22 on the side far from the closest magnetic pole 21 and the corner outer edge 20b of the stator iron sheet 20.

On the other hand, on the sheet surface of the rotor iron sheet 30, the center of a caulking uneven part 33 of the rotor iron sheet 30 is provided on the inside D from an outer edge 30a of the rotor iron sheet 30 more than the width Wy (called a yoke width) from an outside edge 25 of the stator iron sheet 20 to a slot part 26 thereof.

To ensure a magnetic path wider than the magnetic path width of the stator, when the yoke width of the stator iron sheet 20 is Wy, the rotor 6 is set so that Dr−D>2·Wy, wherein Dr is the diameter of the rotor iron sheet 30 of the rotor 6, and D is a diameter within which the caulking uneven part 33 is provided, and the caulking uneven part 33 is provided on the inside of D.

According to the above-described configuration, the plurality of stator iron sheets 20 are laminated by caulking the caulking uneven parts 23 and 24 of the stator iron sheets 20 by being aligned with each other, and a screw is inserted through the assembling screw holes 22a and 22b and tightened to fix the laminated stator iron sheets 20 to the motor flange 2 and the bracket 3, by which the motor case 5 is assembled. Usually, by using either one of the assembling screw holes 22a and 22b at four corners, the laminated stator iron sheets 20 are assembled to the motor flange 2 and the bracket 3. Also, the plurality of rotor iron sheets 30 are laminated by aligning the caulking uneven parts 33 to form two sets of rotor iron cores 9 (9a, 9b). The two sets of the rotor iron cores 9 (9a, 9b) are assembled to the output shaft 7 with the magnet 8 being interposed therebetween, and is accommodated in the motor case 5.

Since the centers of the caulking uneven parts 23 and 24 of the stator iron sheet 20 are provided on the outside of the minimum circle A the radius r of which is a distance from the center O of the stator iron sheet 20 to the shortest outer edge thereof as described above, the caulking positions (caulking uneven parts 23 and 24) are located at a place that is not on the main magnetic path of the stator iron core 4, so that a core loss caused by caulking can be restrained as far as possible. Similarly, since the caulking portions (caulking uneven parts 33)

are located in a place that is not on the main magnetic path of the rotor iron core 9*a*, 9*b*, the influence of the magnetic flux is difficult to exert, so that a core loss caused by caulking can be restrained as far as possible.

Figure 4:
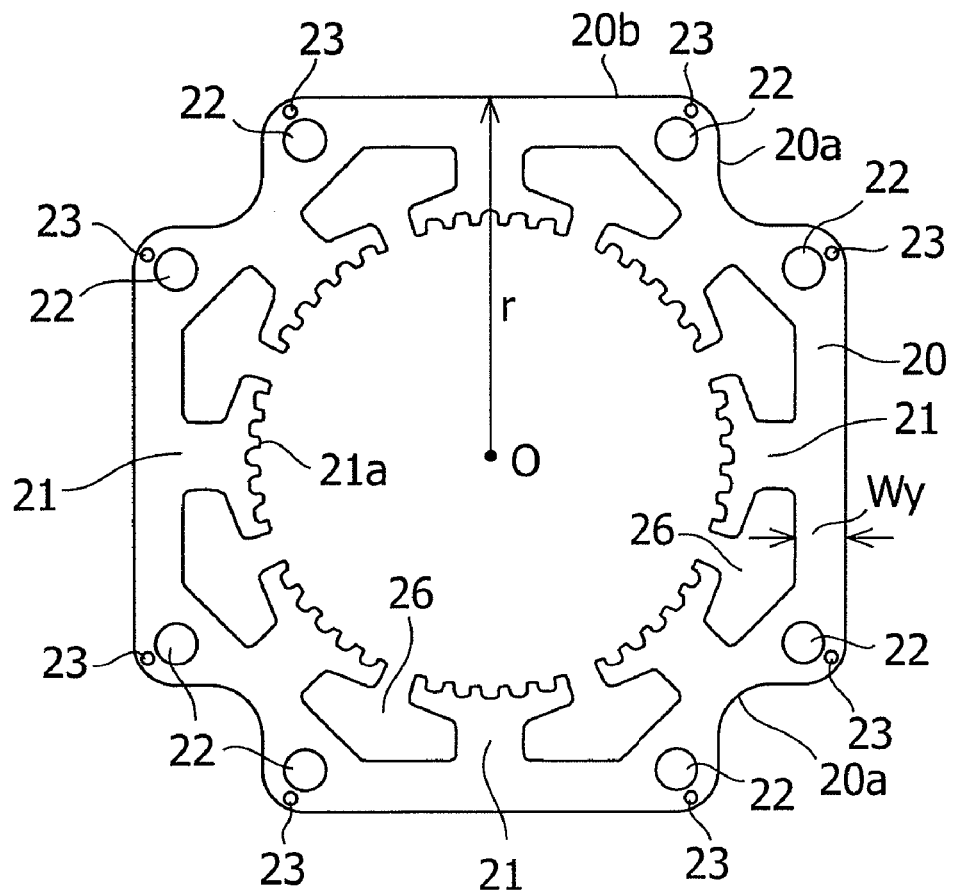
FIG. 4 is a plan view showing caulking uneven parts of a stator iron sheet in accordance with another embodiment of the present invention.
Figure 5:
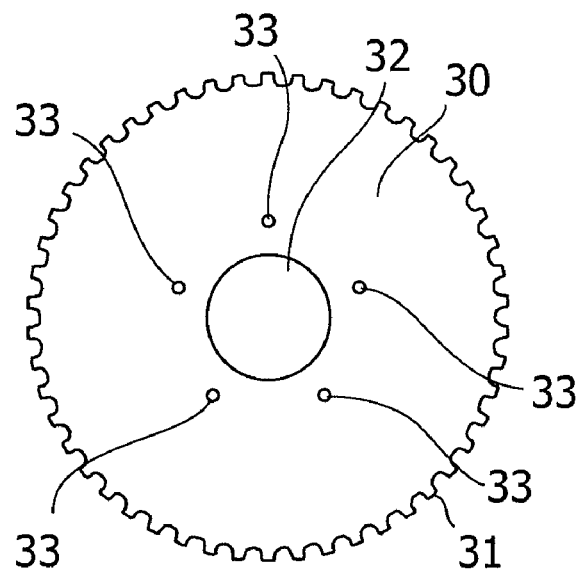
FIG. 5 is a plan view showing caulking uneven parts of a rotor iron sheet in accordance with another embodiment of the present invention.
Figure 6:
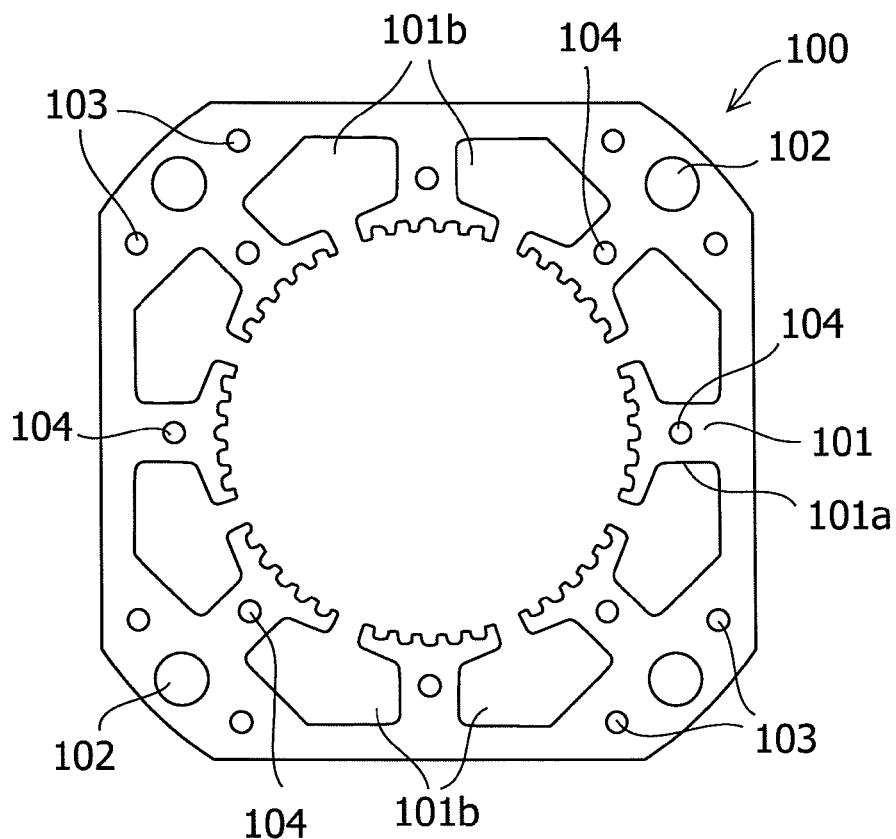
FIG. 6 is a plan view showing caulking uneven parts of a conventional stator iron sheet.
Figure 7:
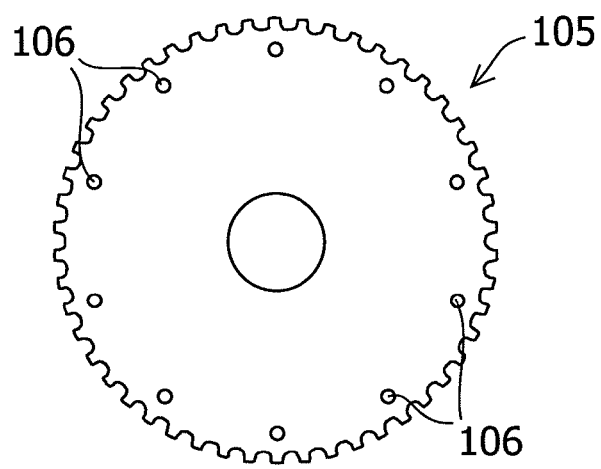
FIG. 7 is a plan view showing caulking uneven parts of a conventional rotor iron sheet.
Figure 8:
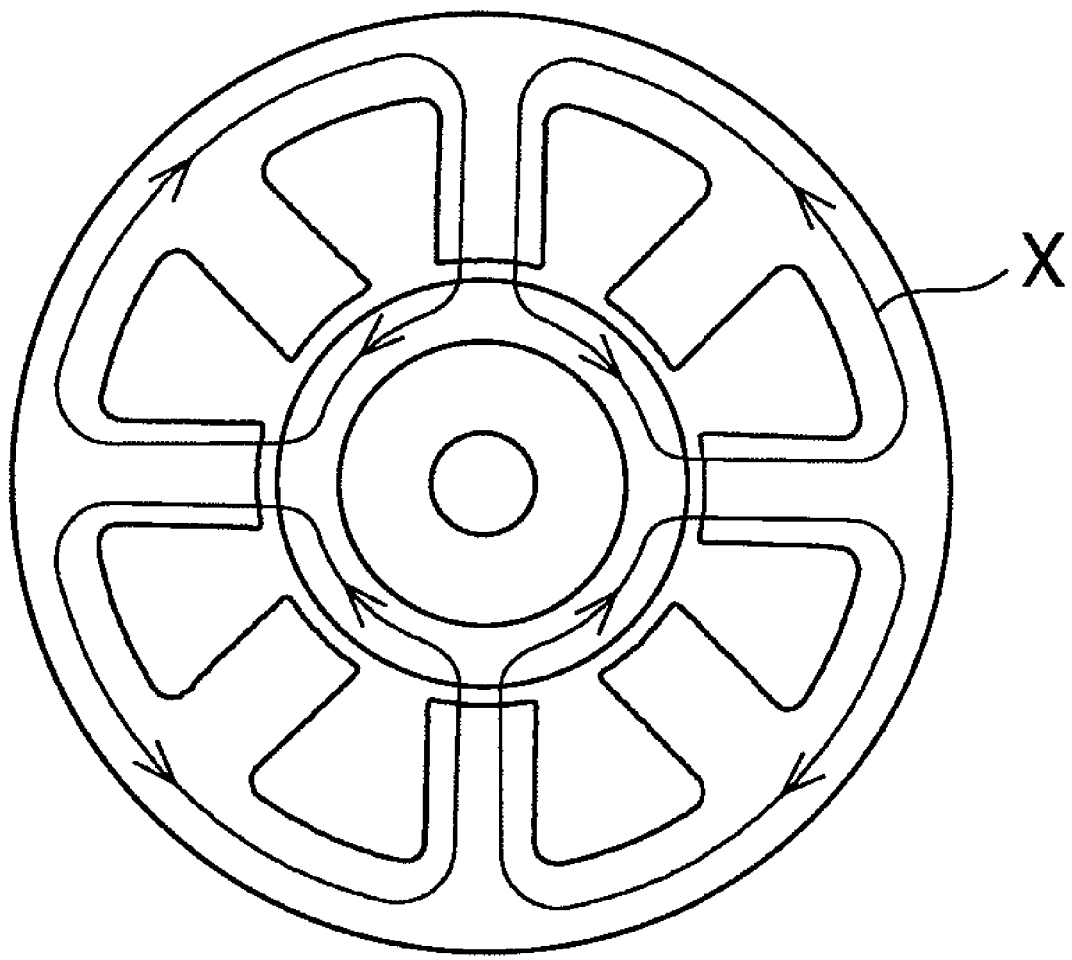
FIG. 8 is a schematic view showing a magnetic path of a hybrid stepping motor.

FIGS. 4 and 5 show another embodiment of the present invention, in which the same symbols are applied to elements that are the same as those in FIGS. 2 and 3. In this embodiment, the caulking uneven parts formed on the stator iron sheet 20 and the rotor iron sheet 30 are formed by the uneven parts 23 and 33 only, and the uneven parts 24 and 34 are omitted (the number of uneven parts are reduced).

In the case where the strength provided by caulking only is insufficient, the stator iron core 4 and rotor iron core 9 after being subjected to annealing can be reinforced by an adhesive. In the case where annealing is performed, bonding is performed after annealing.

Further, the stator iron sheet 20 and rotor iron sheet 30 for lamination can further reduce a loss by appropriately changing the thickness thereof.

The present invention is not limited to the above-described embodiments. For example, although the centers of the caulking uneven parts 23 and 24 of the stator iron sheet 20 are provided on the outside of the minimum circle A the radius r of which is a distance from the center O of the stator iron sheet 20 to the shortest outer edge thereof, they are preferably provided on the outside as far as possible. The diameter, height, or the like of the caulking uneven part formed on the stator iron sheet 20 and the rotor iron sheet 30 can be set as necessary. It is thought that the smaller the diameter or depth of the caulking uneven part is, the better because a core loss (eddy current loss) decreases as the contact resistance between iron sheets increases. However, since there is a problem of strength, it is thought that a diameter not larger than 1 mm and a depth of 70% of the iron sheet thickness is reasonable. Also, the above-described embodiments were explained using a hybrid stepping motor as an example. However, the present invention can be applied to motors of other types. Thus, needless to say, changes can be made appropriately without departing from the spirit and scope of the present invention.

The invention claimed is:

1. A laminated core structure of a motor, comprising a stator iron core formed by laminating a plurality of stator iron core thin sheets in which a plurality of magnetic poles are provided at fixed intervals along the circumferential direction on the inner peripheral side so as to project toward the center direction, and a rotor iron core which is arranged on the axis line of the stator iron core concentrically with the stator iron core and is formed by laminating a plurality of disc-shaped rotor iron core thin sheets, the stator iron core and the rotor iron core each being fastened by caulking the plurality of thin sheets to each other, wherein the center of a caulking uneven part of the stator iron core thin sheet is provided on the outside of a minimum circle the radius of which is a distance from the center of the stator iron core thin sheet to the shortest outer edge thereof, and the center of a caulking uneven part of the rotor iron core thin sheet is provided on the inside from an outer edge of the rotor more than the width from an outside edge of the stator iron core thin sheet to a slot part thereof.

2. The laminated core structure of a motor according to claim 1, wherein the stator iron core has a substantially square-shaped external shape, and the center of the caulking uneven part of the stator iron core thin sheet is provided between an assembling screw hole formed at four corners of the stator iron core thin sheet and a corner outer edge of the stator iron core thin sheet.

* * * * *